US007054429B2

(12) United States Patent
Creamer et al.

(10) Patent No.: US 7,054,429 B2
(45) Date of Patent: May 30, 2006

(54) METHOD AND SYSTEM FOR CALL NOTIFICATION

(75) Inventors: Thomas E. Creamer, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 10/086,391

(22) Filed: Mar. 1, 2002

(65) Prior Publication Data

US 2003/0165225 A1    Sep. 4, 2003

(51) Int. Cl.
H04M 3/42 (2006.01)
(52) U.S. Cl. .......................... 379/215.01; 379/142.08; 379/207.16; 379/373.02; 709/227; 709/248; 370/252; 704/270.1
(58) Field of Classification Search ............ 379/88.21, 379/207.16, 215.01, 911, 372, 201.12, 142.08, 379/214.01, 373.01–373.03; 455/413; 704/270, 704/270.1; 713/400; 709/248, 227; 370/252, 370/356
See application file for complete search history.

(56) References Cited

U.S. PATENT DOCUMENTS

| 5,263,084 | A |   | 11/1993 | Chaput et al. ............... 379/215 |
| 5,473,671 | A |   | 12/1995 | Partridge, III ................ 379/59 |
| 5,559,860 | A | * | 9/1996  | Mizikovsky ................. 455/413 |
| 5,636,269 | A | * | 6/1997  | Eisdorfer ................. 379/215.01 |
| 5,636,270 | A |   | 6/1997  | Davey ......................... 379/352 |
| 5,884,262 | A | * | 3/1999  | Wise et al. ............... 704/270.1 |
| 5,930,501 | A | * | 7/1999  | Neil ............................. 713/400 |
| 6,026,156 | A | * | 2/2000  | Epler et al. ............. 379/215.01 |
| 6,028,917 | A |   | 2/2000  | Creamer et al. ....... 379/100.01 |
| 6,038,305 | A |   | 3/2000  | McAllister et al. ......... 379/207 |
| 6,067,355 | A |   | 5/2000  | Lim et al. ................... 379/142 |

(Continued)

FOREIGN PATENT DOCUMENTS

FR            0986223 A2 *    3/2000

OTHER PUBLICATIONS

*Residential Services, Distinctive Ringing/Call Waiting*, Nortel Networks, <http://www.nortelnetworks.com/products/01/dms100/res_services/network/distinctive.html>, (Visited Jun. 21, 2001).
*Distinctive Ringing Call Waiting*, Prairie Grove Telephone Co., <http://www.pgtc.net/telephone/custom_{13} calling/distinctive_ring_call_waiting/>, (Visited Jun. 21, 2001).
*Phone, Distinctive Ringing*, RCN Phone, <http://www.rcn.com/phone/features/ring/main_ring.html>, (Visited Jun. 21, 2001).
*Selective Distinctive Ringing/Call Waiting*, <http://www.ruraltelephone.com/callfeatures/selectdistinctring.htm>, (Visited Jun. 21, 2001).

*Primary Examiner*—Fan Tsang
*Assistant Examiner*—Md S. Elahee
(74) *Attorney, Agent, or Firm*—Akerman Senterfitt

(57) ABSTRACT

A method for providing a call waiting notification to a participant in an existing telephone call includes the steps of establishing a telephone call with a calling party. A specified telephone number of the participant in the existing telephone call is received from the calling party. A distinctive call waiting tone is caused to be sent to the participant wherein the distinctive call waiting tone is specified with the calling party. Responsive to the participant electing to speak with the calling party, the established call is transferred to the participant. A system for providing a call waiting notification to a participant in an existing telephone call is also disclosed.

20 Claims, 3 Drawing Sheets

U.S. PATENT DOCUMENTS

| | | | |
|---|---|---|---|
| 6,108,630 A * | 8/2000 | Kuechler et al. | 704/270 |
| 6,160,877 A | 12/2000 | Tatchell et al. | 379/197 |
| 6,178,167 B1 | 1/2001 | Fraser | 370/359 |
| 6,263,071 B1 * | 7/2001 | Swan et al. | 379/372 |
| 6,415,026 B1 * | 7/2002 | Flood | 379/215.01 |
| 6,519,335 B1 * | 2/2003 | Bushnell | 379/215.01 |
| 6,563,797 B1 * | 5/2003 | Kung et al. | 370/252 |
| 6,631,188 B1 * | 10/2003 | Sands | 379/215.01 |
| 6,636,506 B1 * | 10/2003 | Fan | 370/356 |
| 6,714,637 B1 * | 3/2004 | Kredo | 379/215.01 |
| 2002/0037075 A1 * | 3/2002 | Flanagan | 379/201.12 |
| 2002/0141559 A1 * | 10/2002 | Gurgun | 379/215.01 |
| 2002/0146107 A1 * | 10/2002 | Baals et al. | 379/215.01 |
| 2003/0023759 A1 * | 1/2003 | Littleton et al. | 709/248 |

* cited by examiner

| Class | Tones |
|---|---|
| Parent/Relative | 1 |
| Area Code | 2 |
| Region | 3 |
| Password | 4 |
| Time of Day | 5 |
| Commercial/Residential | 6 |
| Gender | 7 |

ID NOTIFICATION

BACKGROUND OF THE INVENTION

1. Technical Field

This invention relates generally to telephony, and more particularly to call notification.

2. Description of the Related Art

The proliferation of advanced telephony services has included services directed to call notification. One such service is caller identification or "caller ID," which notifies a called party of the name and/or telephone number of the calling party. Call waiting is another service which notifies the called party of an incoming call when the called party is already on an existing call. This notification typically is a call waiting tone which is provided to the called party over the telephone line. By pressing the "flash" button on the telephone, the called party can speak to the incoming caller. The called party can return to the existing call by pressing the "flash" button again. The called party can hang up while connected to either call, and return to the other call. This affords the called party the option of taking the incoming call, ignoring the incoming call, or speaking temporarily with the incoming caller so as to arrange for a follow-up call.

The call waiting tone that is provided to the called party, however, provides no specific information about the incoming call. As a result, the called party has no way of knowing the nature of the incoming call and may choose to ignore potentially important incoming calls.

SUMMARY OF THE INVENTION

A method of providing for a call-waiting notification to a participant in an existing telephone call includes the step of establishing a telephone call with a calling party. A specified telephone number of the participant in the existing telephone call is received from the calling party. A distinctive call-waiting tone is caused to be sent to the participant, wherein the distinctive call-waiting tone is specified with the calling party. Responsive to the participant electing to speak with the calling party, the established call is transferred to the participant.

Calling party call information can be received, and a distinctive call-waiting tone can be sent to the participant based upon the call information. In one aspect, the call information identifies the call as out-of-area code with respect to the participant. In another aspect, the call information includes password information, and the password information can be verified prior to processing the call. In yet another aspect, subscriptions can be received to the call-waiting service provider, and a call-waiting subscription can be verified when a call is received by the call-waiting service provider. A list of available call-waiting messages can be provided. A selection of a message can be received from a caller, and a distinctive call-waiting tone can be sent to the participant according to the selection.

A system for providing for a caller a call-waiting notification to a participant in an existing telephone call includes a call-waiting service provider configured to receive a call from a calling party to identify in the received call a telephone number associated with the participant. A distinctive call-waiting tone generator is configured to generate distinctive call-waiting tones based upon characteristics of the calling party. A switch is provided for transferring the received call to the participant if the participant elects to accept the call.

A database of authorized passwords can be provided, and a data processing system can verify a password received from the caller by comparing the password to the database of passwords. A table of available call-waiting messages can be provided and a data processing system can receive from the caller a selection of a message and assign a call-waiting tone according to the selection. A data processing system can receive call information from the caller, and send a distinctive call-waiting tone to the participant according to the call information. The call information can identify the caller as being out-of-area code with respect to the participant, and the system can send a distinctive call-waiting tone to indicate to the participant that the call is out-of-area code. The call information can also include password, time of day, point of origin, geographical location, and time zone information.

A system for providing a call-waiting notification to participants in corresponding telephone calls can include fixed data storage for storing a list of call characteristics. A computer can be provided for matching the call characteristics with entries in the list. A call analyzer can detect characteristics in the received calls. A call-waiting tone generator can produce distinctive call-waiting tones according to the entries in the list which match the detected call characteristics, and a tone transmitter can send distinctive call-waiting tones to the participants. A structure can be provided for selecting call characteristics from a menu of available call characteristics. The selection can be made through a telephone connection or an Internet connection.

A method for providing a call-waiting notification to a participant in a telephone call can include the steps of storing a list of call characteristics and detecting the call characteristics. The call characteristics are compared to the list of call characteristics to determine if there is a match. A call-waiting tone is generated according to the call characteristics of the match, and the call-waiting tone is sent to the participant.

BRIEF DESCRIPTION OF THE DRAWINGS

There are shown in the drawings embodiments which are presently preferred, it being understood, however, that the invention is not limited to the precise arrangements and instrumentalities shown.

FIG. 2 is a table illustrating caller classes which can be used with the present invention.

DETAILED DESCRIPTION OF THE INVENTION

The invention disclosed herein provides a method and system for providing a caller participating in an existing call with an audio notification when that caller receives another incoming call from a calling party. The notification can be associated with the calling party who has initiated the incoming call, and thus, can vary according to the identity of the calling party or a class to which the calling party can be assigned.

Figure 1:
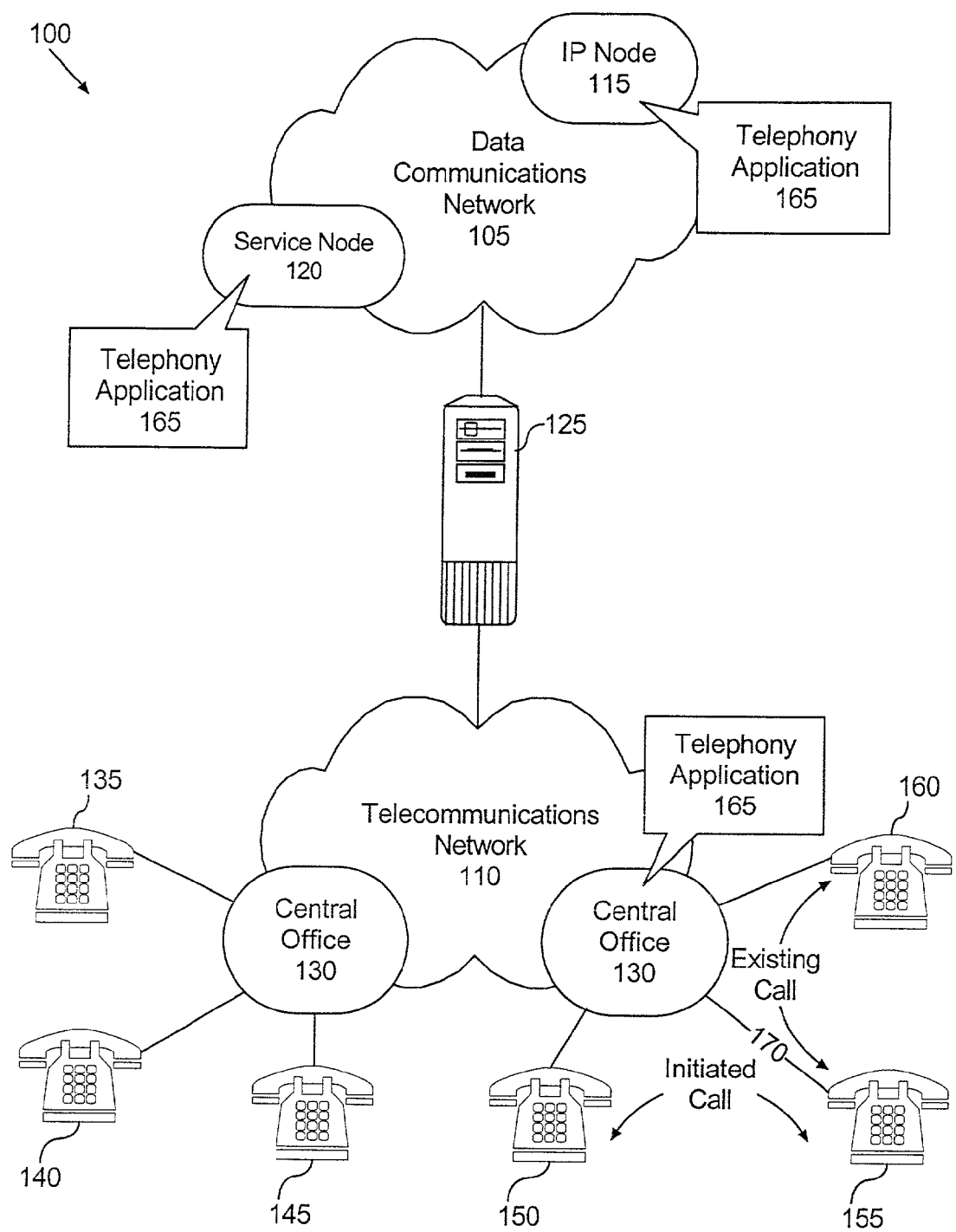
FIG. 1 is a schematic diagram of a call notification system in accordance with the inventive arrangements disclosed herein.

FIG. 1 is a schematic diagram illustrating an exemplary system for call notification in accordance with the inventive arrangements disclosed herein. As shown in FIG. 1, system 100 can include a data communications network 105 and a telecommunications network 110 communicatively linked to one another through a gateway 125 such as a Voice-over-IP (VoIP) gateway. The telecommunications network 110 can include, for example, the public switched telephone network (PSTN).

Local access to subscriber terminals 135-160 can be provided via the central offices 130. Still, the term subscriber terminals is not limited to land line telephones. Rather, as used herein, subscriber terminals can include wireless voice communications devices including wireless telephones and computer-based devices communicatively linked to the data communications network 105. As such, the term telephone call or call can include, but is not limited to, voice communications between land line devices, wireless devices, and/or computer-based terminals or devices.

The central offices 130 can include a telephone switching system having one or more telephony applications 165 stored therein. The telephony application 165 can include telephony resources such as application programs and data stores which provide enhanced telephony service features to subscribers. For example, the telephony application 165 can provide subscribers with telephony service features such as caller identification (ID), call waiting, three-way calling, call forwarding, call transfer, call screening, and call rejection. Additionally, the telephony application 165 can provide enhanced routing functions relating to the setup, maintenance, and termination of the calls initiated by calling parties using the subscriber terminals 135–160. The telephony application 165 further can be included within a service control point which can be linked to databases within the telephony network. Through the service control point, the telephony application 165 can process control service inquiries and provide services such as 800, and 900 numbers, virtual private networking, three-way calling, and the like.

The data communications network 105, for example the Internet, can include one or more IP nodes 115 and one or more service nodes 120. The IP nodes 115 and the service nodes 120 can provide Web-based IP switching for both IP and traditional telephony networks. As shown, the telephony application 165 also can be included within the IP node 115 and the service node 120.

The invention, which can be implemented as telephony application 165, can be implemented within the telephone switching system within the central office 130, or within a service control point within the telecommunications network. The service also can be implemented within the IP node 115 or the service node 120 of the data communications network 105, or within the gateway 125. For instance, a data processing system can be provided having a database associated therewith. The database, which may or may not be proximal to the data processing system, can be accessed via a suitable communications connection.

In operation, subscriber 155 can be involved in an existing telephone call with subscriber 160. As shown in FIG. 1, the telephone call can be processed using the telephone switching system located in the central office 130. Subscriber 150 can initiate a telephone call to subscriber 155 also through the telephone switching system 130. In the prior art, if subscriber 155 subscribed to a call waiting service, a call waiting tone would be delivered to subscriber 155 through the subscriber's telephony equipment. As the call waiting tone is always the same, however, subscriber 155 would have no further information about the incoming call.

According to the invention, however, call information relating to subscriber 150 can be received and a distinctive call waiting tone can be provided to subscriber 155. This information can be provided as a distinctive call waiting tone which indicates the class to which the subscriber 150 belongs. A number of different classes are possible. In one aspect, the tone indicates that the call is from a parent or relative. In another aspect, the call waiting tone can indicate that the call is from a friend or acquaintance. In another aspect, the call waiting tone can indicate that the call is out-of-area code. The tone can indicate that the call is originating from a particular geographical region, such as a city, country, or the like. The tone can indicate that the caller belongs to a class having knowledge of a particular password. It can also indicate a class in which the originating caller is calling from a particular time zone, such that the called party 155 will have knowledge that perhaps the calling party is calling late at night at the point of origin. The call waiting tone can indicate a class distinction between commercial and residential callers. The call waiting tone can also indicate gender. Any number of particular classes are possible, and the foregoing are provided as examples, and should not be viewed as limiting the scope of the invention.

Each caller in the class can be associated with a unique telephone number. The system can identify the caller as a member of a particular class and assign a distinctive call waiting tone based upon the identified class. Although in most cases the caller classes can include two or more callers, the caller classes can include single callers such that different individual callers can be associated with distinctive call waiting tones.

In another embodiment of the invention, incoming calls can be received by, for example, a data processing system within service node 120, IP node 115, gateway 125, or a telephone switching system, through a designated directory number (DN). In that case, the subscriber 150 can call the DN and the call can be received by the data processing system. The data processing system then can ascertain the class of the call. The class of the call can in some instances be determined by information accompanying the call, such as the area code of the call. The area code can be used to readily determine whether the call is out-of-area code, the city or country of origin, and the time zone at point of origin. The telephone number can be used to determine whether the call is from a commercial or residential listing. The data processing system may make reference to the database to make this determination or may access one or more other databases or remote databases in order to make this determination.

The data processing system may also receive identifying information input from the subscriber 150 to make this determination. For example, this information can be a password, or can be responses to queries supplied to the subscriber 150 as by a speech recognition system. Suitable prompts and speech recognition or touch-free data input can be utilized to communicate class identifying information from the subscriber 150 to the data processing system. Regardless of the particular embodiment of the invention, upon determination of the caller class, the data processing system next assigns a call waiting tone to the caller class. Each caller class can have its own call waiting tone, or groups of classes can be assigned common call waiting tones.

A table 180 as shown in FIG. 2 lists examples of caller classes and assigned tones. The tones are indicated numerically, but would be assigned various acoustic characteristics limited only by the ability of the called party to recognize the caller class by the assigned call waiting tone. In one aspect of the invention, a listing of available call waiting tones would be provided to subscriber 155. Subscriber 155 then can select or assign tones to particular classes of callers. For example, subscriber 155 can make such selections through an audio interface using the telephone or through a Web-enabled interface to the system 100 disclosed herein. A playback feature for playing the listed call waiting tones to assist the calling party in making a selection also can be provided.

The assigned call waiting tone then can be sent to the subscriber 155 through a suitable connection 170. The subscriber 155 will be able to identify the class of caller by the distinctive call waiting tone. This information can be used by subscriber 155 to determine whether to answer the incoming call. If subscriber 155 answers the incoming call, a telephone connection can be established between subscriber 150 and subscriber 155. As with current call waiting systems, subscriber 155 can flash between the existing call with subscriber 160, or the incoming call with subscriber 155, and can hang up either line.

Figure 3:
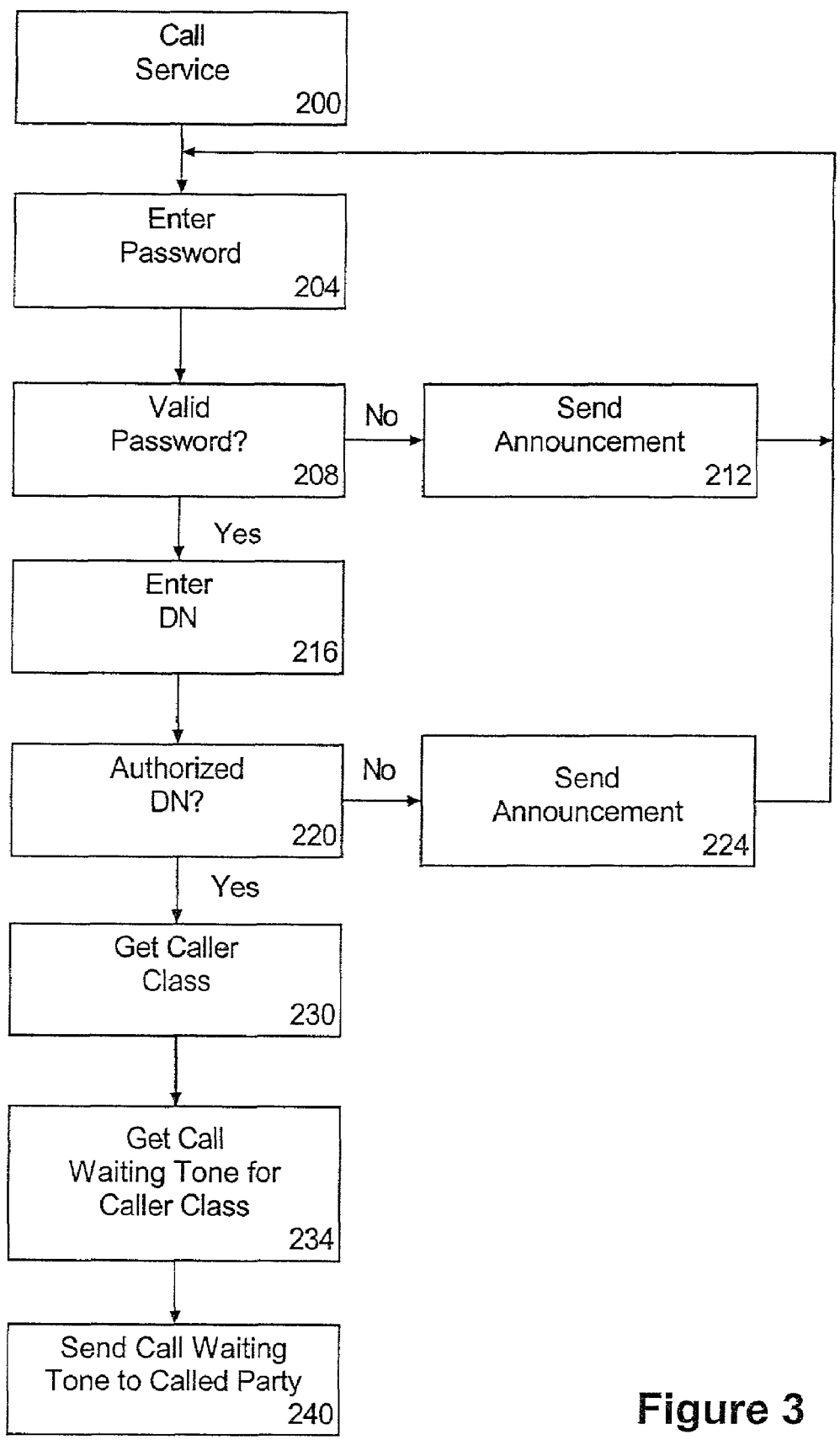
FIG. 3 is a flow chart illustrating a method of call notification in accordance with the inventive arrangements disclosed herein.

An exemplary method of the invention is shown in FIG. 3. A calling party calls the call notification service in step 200. In step 204, the calling party can enter information such as a password either with or without prompts. In step 208, the data processing system determines if a password is valid. If not, an announcement is sent in step 212. If the password is valid, the system can prompt for the DN of the called party in step 216. The system can determine in step 220 if this is a valid DN, such as if the called party has subscribed to the service. If not, an announcement can be sent as in step 224. If the DN is authorized, the caller class for the incoming caller can be obtained in step 230. The call waiting tone for the caller class is obtained in step 234.

The distinctive call waiting tone is sent to the called party in step 240.

A system for providing for a caller a call waiting notification to a participant in an existing telephone call can include a call waiting service provider configured to receive a call from a calling party to identify in the received call a telephone number associated with the participant. A distinctive call waiting tone generator can be configured to generate distinctive call waiting tones based upon characteristics of the calling party. A switch is provided for transferring the received call to the participant if the participant elects to accept the received call.

The call waiting service provider can further include a database of authorized passwords, and a data processing system for verifying a password received from the caller by comparing the password to the database of passwords. A table of available call waiting messages can be provided, and a data processing system can receive from the caller a selection of a message, and can assign a call waiting tone according to the selection. The system can have a database with subscription information, and a data processing system for comparing the telephone number received from the caller to the subscription information in the database.

In another aspect of the invention a system for providing a call waiting notification to participants in corresponding telephone calls has fixed data storage for storing a list of call characteristics. A computer is provided for matching the call characteristics with entries in the list. A call analyzer detects characteristics in received calls. A call waiting tone generator produces distinctive call waiting tones according to the entries in the list which match the detected call characteristics. A tone transmitter sends the distinctive call waiting tones to the participants.

Structure can be provided for selecting the call characteristics from a menu of available call characteristics. The selection can be made through suitable methods such as through a telephone connection or an Internet connection.

A method for providing a call waiting notification to a participant in a telephone call can include the steps of storing a list of call characteristics and detecting call characteristics. The call characteristics are compared to the list of call characteristics to determine if there is a match. A call waiting tone is generated according to the call characteristics of the match. The call waiting tone is sent to the participant. The method can include the step of creating the list of call characteristics. Call characteristics can be selected from a menu of available call characteristics to create the list. The selection can be made through a telephone connection or an Internet connection.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing a call waiting notification to a participant in an existing telephone call, comprising the steps of:

providing a Web-enabled interface through which a telephone subscriber can associate distinctive call waiting tones with calling parties, wherein each of the distinctive call waiting tones is a subscriber selected call waiting tone assigned to said calling parties, wherein the subscriber selects the call waiting tone via said Web-enabled interface over an Internet connection;

receiving train a calling party, over a telephony connection, call information comprising a specified telephone number of a participant in an existing telephone call and at least one of a user name and password, wherein said participant is said subscriber;

identifying said calling party using said call information; and causing a distinctive call waiting tone to be sent to said participant wherein said distinctive call waiting tone is associated with said calling party, and wherein said participant previously associated said distinctive call waiting tone with said calling party via said Web-enabled interface.

2. The method of claim 1, wherein said call information identifies said call as out-of-area code with respect to said participant.

3. The method of claim 1, further comprising the step of receiving subscriptions to a call waiting service, and verifying said call waiting subscription when said call is received by a call waiting service provider.

4. The method of claim 1, further comprising the step of providing a list to said calling party of available call waiting messages, receiving from said calling party a selection of a message, and sending a distinctive call waiting tone to said participant according to said selection.

5. The method of claim 1, further comprising responsive to the participant electing to speak with said calling party, connecting said calling party and participant.

6. A system for providing a call waiting notification to a participant in an existing telephone call, comprising:
- a Web-enabled interface through which a telephone subscriber can associate distinctive call waiting tones with calling parties, wherein each of the distinctive call waiting tones is a subscriber selected call waiting tone assigned to said calling parties, wherein the subscriber selects the call waiting tone via said Web-enabled interface over an Internet connection;
- a call waiting service provider configured to receive a call from a calling party and receive call information comprising a specified telephone number of a participant in an existing telephone call and at least one of a username and password to identify the calling party, wherein said participant is said subscriber;
- a distinctive call waiting tone generator configured to generate distinctive call waiting tones based upon said calling party; and,
- a switch for transferring said received call to the participant if the participant elects to accept the received call.

7. The system of claim 6, wherein said call waiting service provider further comprises a database comprising authorized passwords, and a data processing system for verifying a password received from said calling party by comparing said password to said database of passwords.

8. The system of claim 6, further comprising a table of available call waiting messages, and a data processing system for receiving from said calling party a selection of a message, and for assigning a call waiting tone according to said selection.

9. The system of claim 6, further comprising a data processing system for receiving call information from said calling party, and for sending a distinctive call waiting tone to said participant according to said call information.

10. The system of claim 9, wherein said call information identifies said calling party as being out-of-area code with respect to said participant, and said system sends a distinctive call waiting tone to indicate to said participant that said calling party is out-of-area code.

11. The system of claim 9, wherein said call information further comprises at least one selected from a group consisting of out-of-area code, time of day at point of origin, geographical location, and time zone information.

12. The system of claim 6, wherein said system comprises a database comprising subscription information, and a data processing system for comparing said call information received from said calling party to said subscription information in said database.

13. A system for providing a call waiting notification to a participants in an existing telephone call, comprising;
- a Web-enabled interface through which a telephone subscriber can associate distinctive call waiting tones with calling panics, wherein each of the distinctive call waiting tones is a subscriber selected call waiting tone assigned to said calling parties, wherein the subscriber selects the call waiting tone via said Web-enabled interface over an Internet connection;
- fixed data storage for storing a list of call characteristics for said calling parties, wherein said call characteristics comprise at least one of a user name and password;
- a call analyzer for obtaining call characteristics for received calls, wherein said call analyzer identifies a caller based upon said call characteristics;
- a call waiting tone generator for producing distinctive call waiting tones according to said caller; and,
- a tone transmitter for sending said distinctive call waiting tones to said subscriber when said subscriber is a participant in an existing telephone call.

14. The system of claim 13, wherein said call characteristics include at least one selected from a group consisting of out-of-area code, time of day at point of origin, geographical location, and time zone characteristics.

15. The system of claim 13, further comprising structure for selecting said call characteristics from a menu of available call characteristics.

16. The system of claim 13, further comprising password verification structure.

17. A method for providing a call waiting notification to a participant in a telephone call, comprising the steps of:
- providing a Web-enabled interface trough which a telephone subscriber can associate distinctive call waiting tones with callers, wherein each of the distinctive call waiting tones is a subscriber selected call waiting tone assigned to said calling parties, wherein the subscriber selects the call waiting tone via said Web-enabled interface over an Internet connection;
- storing a list of call characteristics;
- obtaining call characteristics comprising a specified telephone number of a participant in a telephone call and at least one of a user name and password for an inbound call, wherein said participant is said subscriber;
- comparing said call characteristics for said inbound call to said list of call characteristics to identify a caller placing said inbound call;
- generating a call waiting tone according to the caller; and
- sending said call waiting tone to said participant.

18. The method of claim 17, wherein said call characteristics for said inbound call and said call characteristics to identify a caller placing said inbound call include at least one selected from a group consisting of out-of-area code, time of day at point of origin, geographical location, and time zone characteristics.

19. The method of claim 17, further comprising the step of creating said list of call characteristics.

20. The method of claim 19, wherein said step of creating said list of call characteristics comprises the step of selecting call characteristics from a menu of available call characteristics.

* * * * *